US012593942B2

(12) United States Patent
Wells

(10) Patent No.: US 12,593,942 B2
(45) Date of Patent: Apr. 7, 2026

(54) DEFORMABLE PLASTIC VESSEL AND SYSTEM FOR REDUCING PLASTIC WASTE

(71) Applicant: CIRCULR RESEARCH PTY LTD, Collingwood (AU)

(72) Inventor: Joel Wells, Collingwood (AU)

(73) Assignee: CIRCULR RESEARCH PTY LTD, Collingwood (AU)

( * ) Notice: Subject to any disclaimer, the term of this patent is extended or adjusted under 35 U.S.C. 154(b) by 182 days.

(21) Appl. No.: 18/580,011

(22) PCT Filed: Jul. 20, 2022

(86) PCT No.: PCT/AU2022/050774
§ 371 (c)(1),
(2) Date: Jan. 17, 2024

(87) PCT Pub. No.: WO2023/000034
PCT Pub. Date: Jan. 26, 2023

(65) Prior Publication Data

US 2024/0237860 A1 Jul. 18, 2024

(30) Foreign Application Priority Data

Jul. 20, 2021 (AU) ................................ 2021902231

(51) Int. Cl.
*A47K 5/12* (2006.01)
*B05B 11/00* (2023.01)
*B05B 11/10* (2023.01)

(52) U.S. Cl.
CPC ........ *A47K 5/1205* (2013.01); *B05B 11/0038* (2018.08); *B05B 11/0054* (2013.01); *B05B 11/1047* (2023.01)

(58) Field of Classification Search
CPC ................ A47K 5/1205; A47K 5/1211; B05B 11/0038; B05B 11/0054; B05B 11/1047;
(Continued)

(56) References Cited

U.S. PATENT DOCUMENTS 5,421,485 A * 6/1995 Furuta .................. B05B 11/026 222/105
6,419,393 B1 * 7/2002 Shibata .................. B65D 75/26 222/82

(Continued)

FOREIGN PATENT DOCUMENTS

GB 2586015 A 2/2021
JP 2003002328 A 1/2003

(Continued)

OTHER PUBLICATIONS

International Search Report dated Sep. 21, 2022 for corresponding International Application No. PCT/AU2022/050774, filed Jul. 20, 2022.

(Continued)

*Primary Examiner* — Vishal Pancholi
(74) *Attorney, Agent, or Firm* — David D. Brush; Westman, Champlin & Koehler, P.A.

(57) ABSTRACT

A system for holding and delivering personal care products, household agents, cleaning products, horticultural products, food products and the like, such as for holding and dispensing a movable substance. The system includes: a deformable vessel configured to hold a movable substance and having a connecting portion; a vessel housing configured to receive the vessel, a dispenser configured to cause or allow a movable substance to flow from the vessel via the connecting portion to outside the system, a dispenser retainer configured to maintain the dispenser in operable association with a movable substance held by the vessel, wherein the dispenser retainer is engageable with the vessel, and the vessel housing is configured to support the dispenser retainer at a vertical level allowing for the engagement.

20 Claims, 9 Drawing Sheets

(58) Field of Classification Search
CPC ... B05B 11/026; B65D 83/771; B65D 41/165; B65D 41/0421
See application file for complete search history.

(56) References Cited

U.S. PATENT DOCUMENTS

| | | | | |
|---|---|---|---|---|
| 11,033,920 | B2 * | 6/2021 | Toh | B05B 15/30 |
| 2017/0144176 | A1 | 5/2017 | Toh et al. | |
| 2019/0200813 | A1 * | 7/2019 | Toh | B05B 15/30 |
| 2022/0348396 | A1 * | 11/2022 | Hennemann | B65D 83/768 |

FOREIGN PATENT DOCUMENTS

| | | | |
|---|---|---|---|
| JP | 2008114859 | A | 5/2008 |
| WO | 9508317 | A1 | 3/1995 |
| WO | 2008069213 | A1 | 6/2008 |
| WO | 2021013492 | A1 | 1/2021 |
| WO | 2021138708 | A1 | 7/2021 |
| WO | 2022140818 | A1 | 7/2022 |

OTHER PUBLICATIONS

Written Opinion of the International Searching Authority dated Sep. 21, 2022 for corresponding International Application No. PCT/AU2022/050774, filed Jul. 20, 2022.

* cited by examiner

DEFORMABLE PLASTIC VESSEL AND SYSTEM FOR REDUCING PLASTIC WASTE

The present application is a Section 371 National Stage Application of International Application No. PCT/AU2022/050774, filed Jul. 20, 2022, and published as WO 2023/000034 A1 on Jan. 26, 2023, in English, which claims priority from Australian provisional patent application 2021902231, filed Jul. 20, 2021, the contents of which are hereby incorporated by reference in their entireties.

FIELD OF THE INVENTION

The present invention relates generally to means for holding and delivering movable substances for which plastic containers are typically used. Such movable substances include but are not limited to those sold in pharmacies, hardware stores, office supply stores, and suppliers of products used in heavy and light industry. Exemplary products which may be held and delivered by the present invention include personal care products, household agents, cleaning products, horticultural products, food products and the like.

BACKGROUND TO THE INVENTION

The environmental problem of plastics is well established. In recent years especially, the scourge of single-use plastic products has been highlighted as a significant problem in littering land and marine environments and as a huge contributor to landfill.

One example of a problematic single-use plastic is the liquid soap dispenser which is virtually ubiquitous in bathrooms across the developed world. The liquid soap is contained in a plastic bottle having a threaded neck, with a dispensing mechanism (typically a pump) being wound onto the threaded neck. When the vessel is emptied of liquid soap, the vessel is typically placed by the consumer into a municipal recycling stream, while the dispensing mechanism can be reused by application to a newly purchased filled bottle. While the dispensing mechanism may be reused many times, the bottle is used once only, and typically enters the recycling system. Plastics are not as easily recyclable as the manufacturers would have a consumer believe, and therefore alternatives to the bottle portion of liquid soap containers have been keenly pursued by industry.

The prior art provides a range of alternatives to plastics, including biodegradable or compostable plant-based materials. Such materials are typically not well suited to containing high water content products, and products having a pH away from neutral. Liquid soaps and other personal care products are generally speaking aqueous solutions or emulsions having an acidic pH, and are therefore not amenable to containment in such alternative materials.

Biodegradable plastics are also required to be separated from all other plastic types, which is a difficult and manual process, before being treated at high temperatures to activate their biodegradation. This heating requires a fuel source adding to the ecological footprint of the plastic. In any event, the requirement for manual processing and heating adds to the expense in recycling biodegradable plastics.

A further problem is that manufactures have invested significantly in equipment for the production of plastic containers. Manufacturers will not readily transition away from plastic containers given the trouble, effort and expense of reconfiguring their supply streams and production facilities to produce non-plastic alternatives.

The prior art has therefore devised various containers having reduced amounts of plastic. Containers having thin walls are known in the art. While effective at reducing the amount of plastic required in production, such containers have little mechanical strength and are easily deformable. While deformability is not overly problematic for containers that are handled only once before being discarded (such as a single serving beverage container), for other applications further problems are raised.

As proposed by the present invention, a deformable reduced-plastic container may be used as a refill and in that circumstance the lack of mechanical strength causes difficulty in connecting a dispenser (such as a liquid pump) to the container. Particularly, when a dispenser is manually connected to the container by a consumer, the dispenser is pushed against the container. Difficulty arises in making the connection due to the connecting portion of the deformable container retreating from the dispenser as the dispenser is pushed onto it. In that circumstance, the consumer would be required to grasp and hold steady the connecting portion with one hand, and with another hand attempt to connect the dispenser. Some consumers may not possess the manual dexterity required to make the connection, any in any event many would prefer a simplified method of connection.

It is an aspect of the present invention to provide an improvement to prior art containers and systems for holding and dispensing movable household products, personal care products, foodstuffs and also industrial products. It is a further aspect of the present invention to provide a useful alternative to prior art containers and systems.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed before the priority date of each claim of this application.

SUMMARY OF THE INVENTION

In a first aspect, but not necessarily the broadest aspect, the present invention provides a system for holding and dispensing a movable substance, the system comprising: a deformable vessel configured to hold a movable substance and comprising a connecting portion; a vessel housing configured to receive the vessel, a dispenser configured to cause or allow a movable substance to flow from the vessel via the connecting portion to outside the system, a dispenser retainer configured to maintain the dispenser in operable association with a movable substance held by the vessel, wherein the dispenser retainer is engageable with the vessel, and the vessel housing is configured to support the dispenser retainer at a vertical level allowing for engagement between the dispenser retainer and the vessel connecting portion.

In one embodiment of the first aspect, the dispenser retainer is sealingly engageable with the vessel connecting portion.

In one embodiment of the first aspect, the system is configured such that in the engagement between the dispenser retainer and the vessel, at most only minor or insubstantial downward force is placed on the vessel connecting portion by the dispenser retainer.

In one embodiment of the first aspect, the minor or insubstantial downward force is insufficient to deform the vessel to the point that (i) a sealing engagement between the dispenser retainer and the vessel connecting portion is not possible and/or (ii) a movable substance within the vessel is caused to exit the vessel.

In one embodiment of the first aspect, the system comprises complimentary structures on the dispenser retainer and the vessel connecting portion, and wherein the configuration is provided by the respective design, operation, structure, or material of the complimentary structures.

In one embodiment of the first aspect, the dispenser retainer is rotationally engageable with the vessel connecting portion, or engageable by pushing together the dispenser retainer and the vessel connecting portion.

In one embodiment of the first aspect, the complimentary structures provide for engagement between the dispenser retainer and the vessel connecting portion, the engagement being a threaded engagement, a friction engagement, snap engagement, or another type of engagement.

In one embodiment of the first aspect, the dispenser retainer has a thread, and the vessel connecting portion has a complimentary thread; or the dispenser retainer has a lug, and the vessel connecting portion has a complimentary lug guide; or the vessel connecting portion has a lug, and the dispenser retainer has a complimentary lug guide; or the vessel connecting portion has a friction engagement structure, and the dispenser retainer has a complimentary friction engagement structure; or the vessel connecting portion has a snap engagement structure, and the dispenser retainer has a complimentary snap engagement structure.

In one embodiment of the first aspect, the friction engagement structures are an opening region of the vessel connecting portion, and a channel of the dispenser retainer configured to accept the opening region.

In one embodiment of the first aspect, wherein the dispenser retainer is configured to engage with the vessel housing.

In one embodiment of the first aspect, the dispenser retainer is configured to sealingly engage with the vessel housing.

In one embodiment of the first aspect, the dispenser retainer is rotationally engageable with the vessel housing or is engageable by pushing together the dispenser retainer and the vessel housing.

In one embodiment of the first aspect, the system comprises complimentary structures on the dispenser retainer and the vessel housing, and wherein the configuration is provided by the respective design, operation, structure, or material of the complimentary structures.

In one embodiment of the first aspect, the complimentary structures provide for engagement between the dispenser retainer and the vessel housing, the engagement being a threaded engagement, a friction engagement, a snap engagement, or another type of engagement.

In one embodiment of the first aspect, the dispenser retainer has a thread, and the vessel housing has a complimentary thread; or the dispenser retainer has a lug, and the vessel housing has a complimentary lug guide; or the vessel housing has a lug, and the dispenser retainer has a complimentary lug guide; or the dispenser retainer has a friction engagement structure and the dispenser housing has a complimentary friction engagement structure; or the dispenser retainer has a snap engagement structure and the dispenser housing has a complimentary snap engagement structure.

In one embodiment of the first aspect, wherein the complimentary structures of the dispenser retainer and the vessel connecting portion, are configured to initially mutually engage substantially concomitantly when engaging the dispenser retainer with the vessel connecting portion.

In one embodiment of the first aspect, the complimentary structures of the dispenser retainer and the vessel connecting portion, are configured to initially mutually engage at a substantially different time when engaging the dispenser retainer with the vessel connecting portion.

In one embodiment of the first aspect, where the complimentary structures are threads or a lug and a lug guide, the pitch of the threads, or a pitch of the lug and lug guide, are set such that upon rotation of the dispenser retainer, the vessel is moved toward the dispenser retainer at substantially the same rate or at a faster rate than the dispenser retainer is moved toward the vessel housing.

In one embodiment of the first aspect, the system is configured to prevent rotation of the vessel relative to the vessel housing, but allow rotation of the dispenser retainer to rotate relative to the vessel.

In one embodiment of the first aspect, the vessel and/or vessel housing is/are configured to prevent rotation of the vessel relative to the vessel housing.

In one embodiment of the first aspect, the vessel comprises a formation extending into a complimentary recess of the vessel housing, the formation and recess configured to prevent rotation of the vessel relative to the vessel housing.

In one embodiment of the first aspect, the vessel has a wall formed from a deformable polymer.

In one embodiment of the first aspect, the vessel comprises a closure.

In one embodiment of the first aspect, the closure is partially or completely separable from the vessel and/or is disruptable so as to gain access to a movable substance contained therein.

In one embodiment of the first aspect, the dispenser or the dispenser retainer comprises a closure disrupting element, and the vessel comprises a disruptable closure, and wherein the system is configured such that the closure disrupting element disrupts the disruptable closure as the dispenser retainer is contacted to or engaged with the vessel housing.

In one embodiment of the first aspect, the closure is applied over an opening of the vessel.

In one embodiment of the first aspect, the closure is a foil or a functional equivalent thereof.

In one embodiment of the first aspect, the closure is devoid of a thread for threaded engagement with the vessel.

In one embodiment of the first aspect, the vessel connecting portion is formed has a thickness greater than that of the remainder of the vessel.

In one embodiment of the first aspect, the vessel connecting portion is a neck portion.

In one embodiment of the first aspect, the vessel connecting portion of extends outwardly from an opening of the vessel housing.

In one embodiment of the first aspect, a vessel lateral wall has a thickness of equal to or less than about 0.5 mm, 0.4 mm, 0.3 mm, 0.2 mm or 0.1 mm.

In one embodiment of the first aspect, the vessel lateral wall has a thickness of equal to or less than about 0.3 mm.

In one embodiment of the first aspect, the vessel is a blow moulded plastic vessel.

In a second aspect, the present invention provides a vessel fabricated predominantly or completely from a deformable recyclable polymer, the vessel comprising: a thread, or a lug, or a lug guide, or a friction engagement structure or a snap engagement structure about a vessel opening, and a closure disposed over the vessel opening, wherein the closure is disruptable or peelable.

In one embodiment of the second aspect, a vessel lateral wall has a thickness of equal to or less than about 0.5 mm, 0.4 mm, 0.3 mm, 0.2 mm or 0.1 mm.

In one embodiment of the second aspect, the vessel lateral wall has a thickness of equal to or less than about 0.3 mm.

In one embodiment of the second aspect, the vessel is devoid of a screw cap.

In one embodiment of the second aspect, the vessel is a blow moulded plastic vessel.

In one embodiment of the second aspect, the vessel is enclosed in a vendible form and enclosed in a package.

BRIEF DESCRIPTION OF THE FIGURES

Unless otherwise indicated herein, features of the drawings labelled with the same numeral are taken to be the same features, or at least functionally similar features, when used across different drawings.

Figure 1:
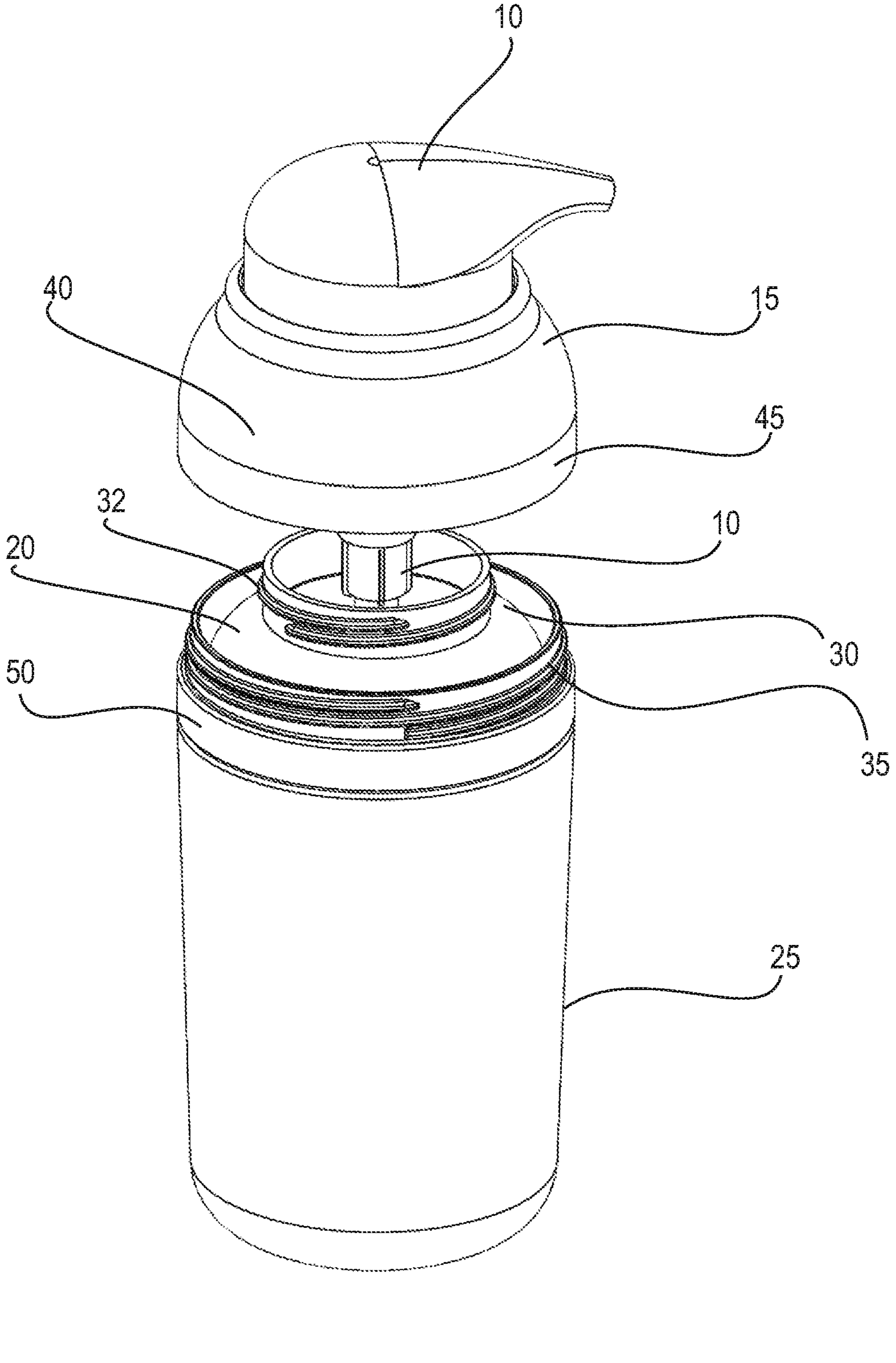
FIG. 1 illustrates a preferred system of the present invention, in perspective view to show the threads formed on the refill vessel and the vessel housing.

The drawings are not prepared to any particular scale or dimension and are not presented as being a completely accurate presentation of the various embodiments.

DETAILED DESCRIPTION OF THE INVENTION AND PREFERRED EMBODIMENTS THEREOF

After considering this description it will be apparent to one skilled in the art how the invention is implemented in various alternative embodiments and alternative applications. However, although various embodiments of the present invention will be described herein, it is understood that these embodiments are presented by way of example only, and not limitation. As such, this description of various alternative embodiments should not be construed to limit the scope or breadth of the present invention. Furthermore, statements of advantages or other aspects apply to specific exemplary embodiments, and not necessarily to all embodiments, or indeed any embodiment covered by the claims.

Throughout the description and the claims of this specification the word “comprise” and variations of the word, such as “comprising” and “comprises” is not intended to exclude other additives, components, integers or steps.

Reference throughout this specification to “one embodiment” or “an embodiment” means that a particular feature, structure or characteristic described in connection with the embodiment is included in at least one embodiment of the present invention. Thus, appearances of the phrases “in one embodiment” or “in an embodiment” in various places throughout this specification are not necessarily all referring to the same embodiment, but may.

As used herein, positional terms such as “lateral”, “across”, “above”, “below”, “higher”, “lower”, “upward”, “downward”, and the like are to be considered with reference to a vessel in its normal upright position. Where indicated in the description, a vessel may be used in a lateral orientation or even an inverted orientation in which case the meaning of such positions will be modified accordingly.

The present invention is predicated at least in part on the inventors’ discovery that a reduced plastic deformable refill vessel is easily connected to a dispenser where the vessel is disposed in a rigid housing and the dispenser is prevented from being pushed downwardly and deforming the vessel by the presence of dispenser retainer that is supported by the housing. Thus, a connecting portion (such as a threaded neck) of the vessel is prevented from any material downward movement and is therefore able to form a connection by way of, for example, engagement with a complimentary thread of the dispenser retainer. The connection is typically sufficiently tight so as to prevent leakage of the movable substance held by the vessel, and may be assisted by one or more seals or sealing surfaces.

In a preferred form of the invention the housing and the dispenser retainer are also mutually connected, by way of complimentary threads for example. Such connection ensures the system components remain associated, even when knocked over or dropped. This connection may be sufficiently tight so as to prevent leakage of movable substance from the connecting portion, and may be assisted by one or more seals or sealing surfaces.

In operation, the consumer removes the dispenser retainer/dispenser and replaces an empty refill in the vessel housing with a full refill. Where the refill is closed with a removable closure, the closure is removed to expose the vessel interior and the movable substance therein. Typically, the closure is disposed over an opening of the vessel connecting portion. For example, the connecting portion may be a neck, and the neck has an opening at its distal end, and the opening is covered by the closure.

In other embodiments, the closure is disruptable and remains in place until disrupted by, for example, by the dispenser retainer or dispenser as it is moved toward or through the connecting portion of the vessel. For example, the closure may be a pierceable foil, and the dispenser has an inlet dip tube, and the distal end of the dip tube is pointed so as to facilitate piercing of the foil. Alternatively, the dispenser retainer may comprise one or more piercing elements configured to pierce the foil and allow movable substance to exit the vessel by gravity for example.

A vessel of the present invention will be a single use vessel intended for use as a refill in multi-use dispenser. The vessel is typically designed to minimise material use and be suitable input into existing mainstream recycling processes. Ideally of the vessel is designed to deliver the highest possible material recovery to underpin a circular economy model. These vessel may have one or more of the following features: being fabricated from a monomaterial (single polymer), being fabricated from the absolute minimum amount of material, being ultra-light weight, having a thin-wall, being easy to separate and identify in a recycling facility, shaped in a space efficient form factor to lower logistics costs, comprise a closure optimized for recycling, being fabricated in a manner that lowers $CO_2$ and/or other undesirable by-products.

In terms of the present system, the reduced-plastic deformable vessel is used as a cartridge refill in combination with the rigid external housing and a dispenser. The manner in which these system components mutually interact with each other is important to user experience, and therefore commercial utility. The present system provides a simple system requiring minimal manipulation by the user: a spent refill vessel is removed from the housing and replaced with a fresh refill vessel, and (optionally with removal of a closure from the fresh vessel) application of the dispenser component to allow the contents of the vessel to be immediately dispensed.

In a highly desirable implementation, the user is able to simply 'lock and load' a refill without any additional steps. Such implementation may depend on the vessel having a disruptable closure which does not need to be removed, the closure being disrupted upon application of the dispenser and/or dispenser retainer.

The present invention will now be more fully described by reference to the non-limiting drawings.

Turning firstly to FIG. 1, there is shown a system of the present invention comprising a dispenser (10) (being a pump in this embodiment), a dispenser retainer (15), a refill vessel (20) and a vessel housing (25). The system is shown with the dispenser retainer (15) separated from the vessel housing (25) with the pump (10) being partially lifted out of the vessel (20) as would be the case when a freshly opened refill vessel (20) has just been disposed in the housing, and the dispenser (10) is being moved downwardly into the vessel (20), and the dispenser retainer (15) also being moved downwardly so as to eventually be stopped and supported by the vessel housing (25).

Figure 2:
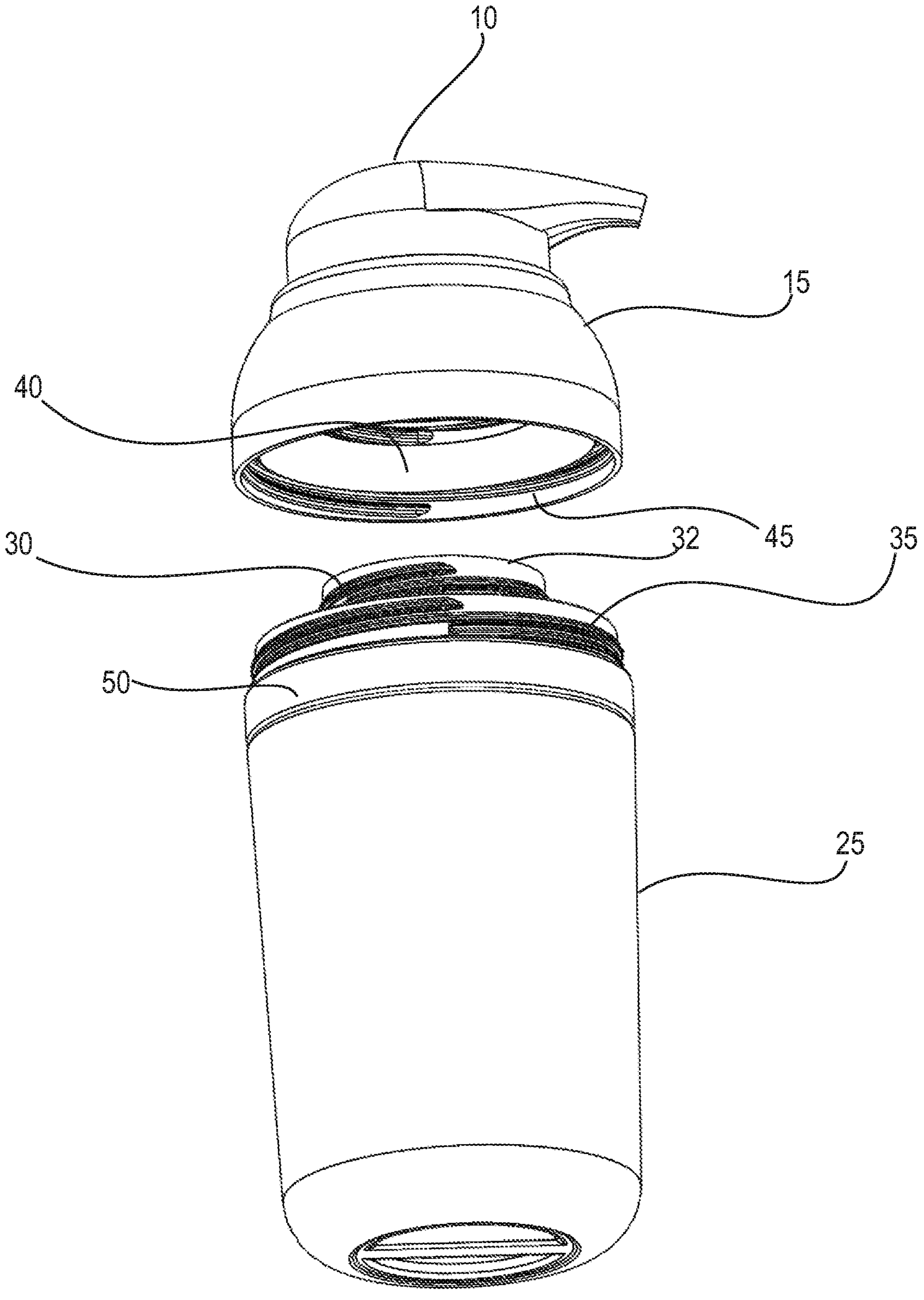
FIG. 2 illustrates the system drawn in FIG. 1, although in a lower perspective view to the upper and lower threads formed in the dispenser retainer. In this illustration, the lower part of the pump is not drawn to improve clarity.

FIG. 1 shows the vessel thread (30) and the vessel housing thread (35). The vessel thread (30) winds around the outside of neck portion (32) and engages with an upper complimentary thread (40) on the inside of the dispenser retainer (15). The vessel housing thread engages with a lower complimentary thread (45), also on the inside of the dispenser retainer (15). The threads on the inside of the dispenser retainer are more clearly shown in FIG. 2. Note that in FIG. 2 the lower portion of the pump is not drawn so as to more clearly show the inside threads (40) (45) of the dispenser retainer (15).

The vessel 25 comprises also a removable stretchable band (50) having indicium thereon to identify the movable substance within the vessel (20). The band (50) may be removed and replaced when a refill vessel having a different movable substance within it. The band (50) has no other function, and has no function in regards to contacting or engaging with another component of the system.

Figure 3:
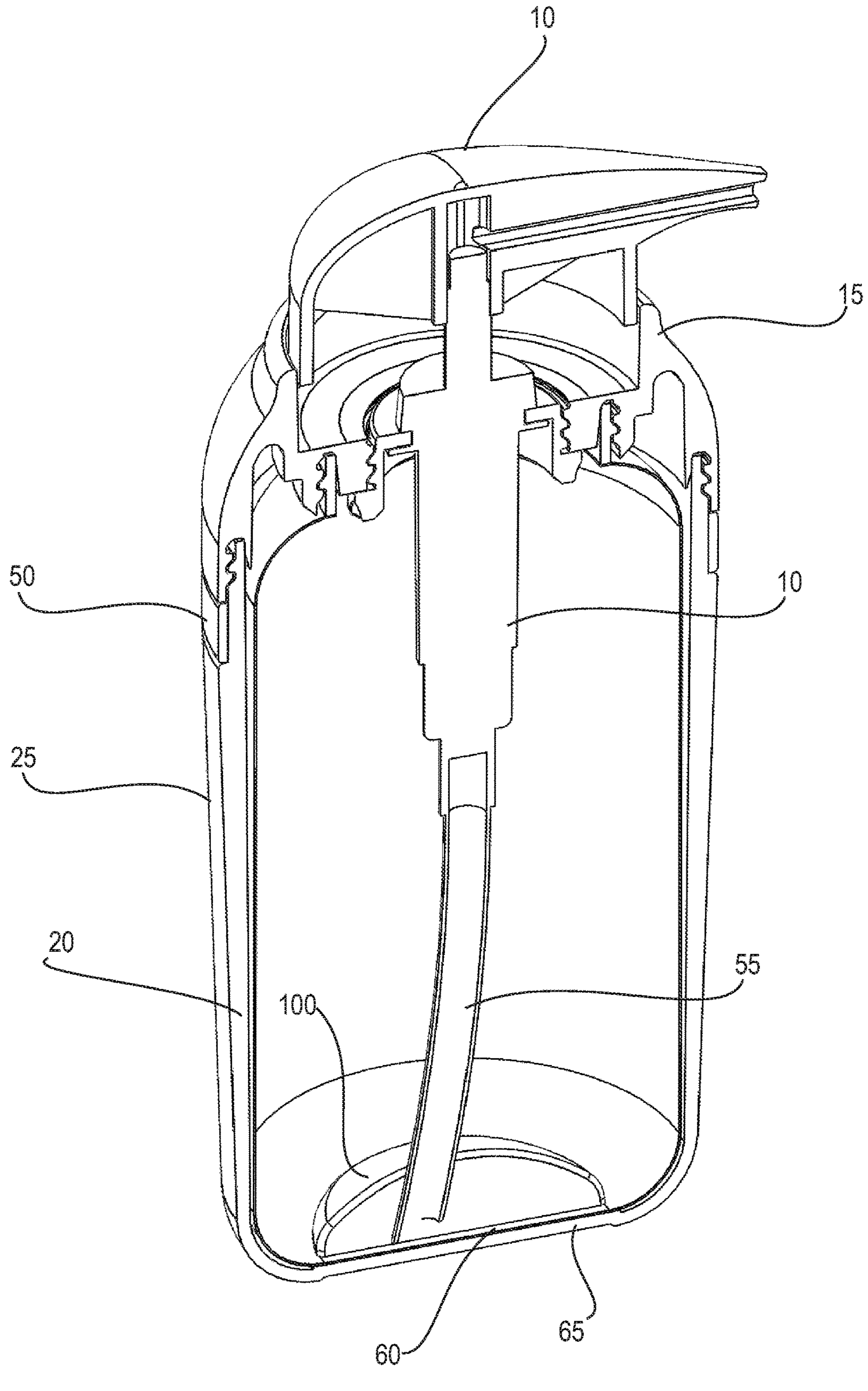
FIG. 3 illustrates a cross-sectional view of the system drawn in FIG. 1, although with all components fully assembled.

Turning now to FIG. 3, the system is shown in fully assembled form, and is ready to dispense a movable composition (not drawn). It will be noted that a dip tube (55) extends from the pump (10) into a lower region of the vessel (20).

Figure 4:
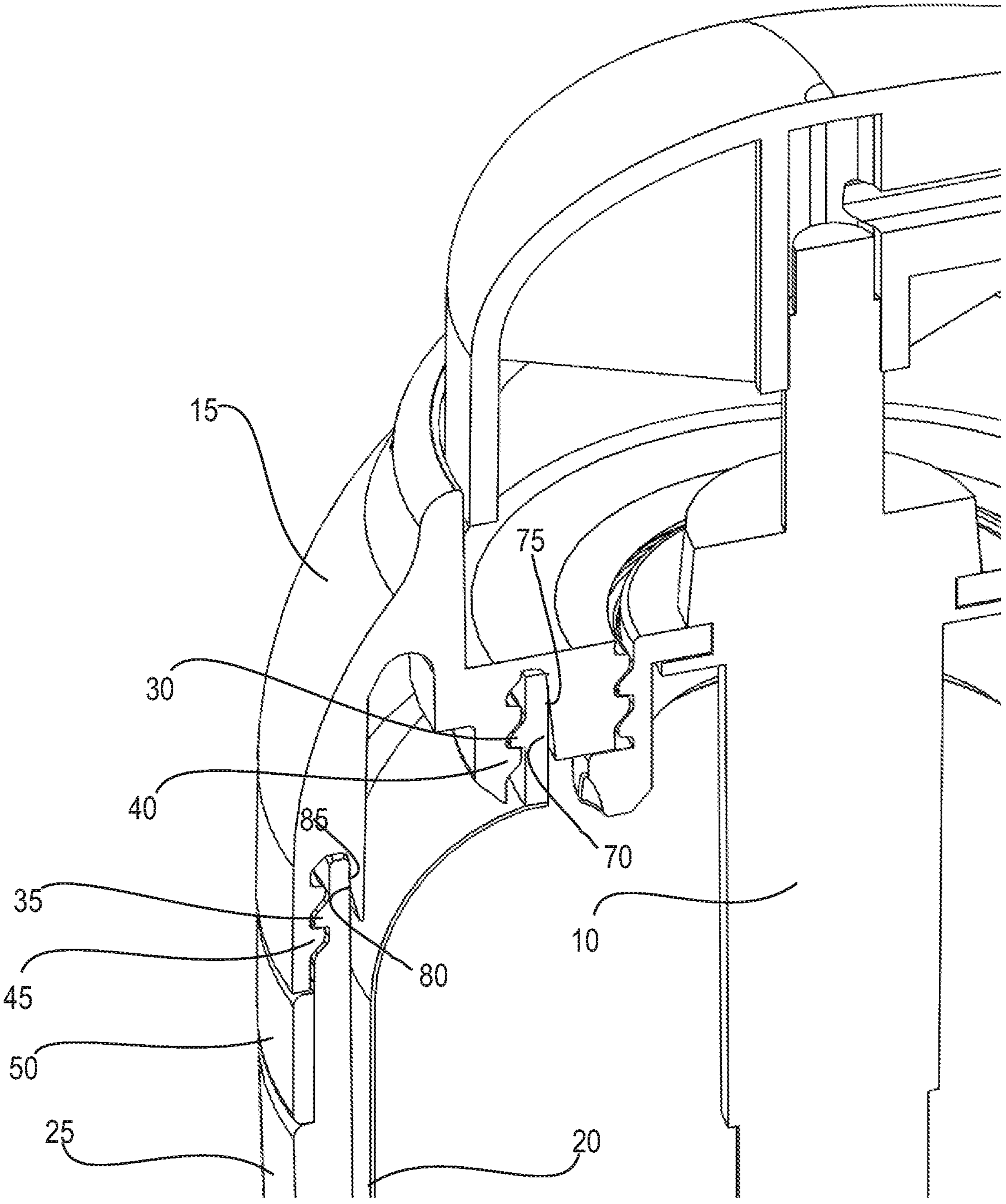
FIG. 4 is a magnified view of a portion of FIG. 3 to show more clearly the various sealing surfaces.

FIG. 4 shows in greater details the engagement of the various threads in the embodiment drawn in FIG. 3. Particularly, the upper thread (40) of the dispenser retainer (15) fully engaged with the thread (30) of the vessel (20); and the lower thread (45) of the dispenser retainer (15) being fully engaged with the thread (35) of the vessel housing (25).

Returning to FIG. 2 it will be noted that the each of the threads (30) (35) (40) and (45) are configured to engage concomitantly upon winding of the dispenser retainer (15) onto the vessel housing (25). Moreover, the vessel (20) thread (30) is disposed at a predetermined vertical level so as to be in vertical spaced relation to the vessel housing (25) thread (35). The same vertical spaced relationship is provided between the upper (40) and lower (45) threads of the dispenser retainer (15). By this arrangement, no downward force is exerted on the vessel (20) including the vessel neck portion (32) so as to cause the neck portion (32) to move downwardly and retreat as the dispenser (10) and dispenser retainer (15) are moved downwardly.

In operation, the user firstly and rests the dispenser retainer (50) on the vessel housing (15) and the vessel (20) neck portion (32). There is no requirement for the user to circumferentially align any of the threads (30) (35) (40) (45). Upon winding the dispenser retainer (15), all threads are brought into circumferential alignment and thereby engage at the same time. As the dispenser retainer (15) is wound further the pitch of the threads (30) (35) (40) (45) causes the vessel (20) to be drawn toward the upper end of the dispenser retainer (15), while the dispenser retainer (15) is drawn toward the upper end of the vessel housing. Thus, while the dispenser retainer (15) is wound down onto the vessel housing (25) the vessel (20) base (60) is drawn away from the advancing vessel housing (20) base (65) (see FIG. 3) thereby avoiding any deformation of the vessel (20) and therefore avoiding retreat of the vessel (20) neck portion (32) away from its complementary thread (40), thereby allowing mutual engagement and the formation of a connection between the dispenser retainer (15) and the and the vessel (20). The so formed connection is sufficiently tight so as to prevent a movable substance in the vessel from leaking outwardly. The engagement between the threads (30) and (45) is sufficiently tight to maintain all components of the system as a single functional unit.

In one embodiment, each thread comprises two (or more) thread starting points. For example, where two starting points are present, they will typically be opposing (i.e, one at the 0 degrees circumferential position and the other at 180 degrees). For greater numbers of starting points, the points will be substantially equally spaced about the circumference. For example, for three starting points the positions will be 0 degrees, 120 degrees and 240 degrees. Advantageously, unlike a single thread starting point (where the engagement only occurs once in a 360-degree rotation), there will be at least two starting points in every 360-degree rotation (or one in every 180-degree rotation). By increasing the number of thread starting points, the user experience is simplified as it requires less rotation (and alignment) to engage the threads. Furthermore, by increasing the number of starting points to two or more, the dispenser retainer will sit substantially level prior to thread engagement, as the multiple threads provide an even surface for the closure threads to rest upon.

When fully seated in the vessel housing (25), the neck portion of the vessel (20) may sit slightly proud (for example, 1 mm) over the upper edge of the vessel housing (25). By this arrangement, the user needs to apply a very slight pressure to engage the threads. That very slight pressure gives positive haptic feedback to the user when the threads engage, thereby allowing the user to more rapidly turn the dispenser retainer (15).

The drawn embodiment further comprises seals configured to become operable concomitantly when the user winds on the dispenser retainer, by sealing at the same degree of the dispenser retainer rotation.

Referring now to FIG. 4, when the dispenser retainer (15) is rotated and the threads engage, the screw action effectively draws the vessel (20) upward (relative to the dispenser retainer) thereby creating a positive seal with the sealing between the scaling surfaces (70) and (75). The upward drawing action obviates the need for the refill body to have sufficient structural integrity (axial strength) to resist the axial compression applied when the dispenser retainer (15) is wound on such that a positive seal is created. As discussed above, a deformable vessel would normally retreat upon an axial compressive force, and in the context of a sealing action, no seal would form. In the present invention, as the surface (75) of the refill vessel (20) positively engages with the sealing surface (70) of the dispenser retainer (15) via the upward motion provided by the screw thread feature (and not by axial compression) the seal will remain constant no matter the state of the refill body (i.e., full, empty, structurally compromised, structurally sound etc). Thus, the refill vessel (20) body (i.e. the non-neck portion) can have an ultra-thin wall given that when the refill vessel (20) is filled with a movable substance, the vessel sits in tension (and not compression) thereby taking all load off the body.

A second pair of sealing surfaces are provided a dispenser retainer surface (80) and a vessel housing surface (85). A seal is formed between these surfaces when the dispenser retainer (15) is wound onto the vessel housing (25), and concomitantly with sealing provided by the surfaces (70) and (75). The seal formed by surfaces (80) and (85) may function to prevent the ingress of water (for example, in a bathroom or kitchen setting).

The drawn embodiment shows each sealing surface being integral to its contributing component. In that circumstance the component is fabricated at least in part from a material that is capable of functioning accordingly, and for example a resiliently deformable material may be chosen. Alternatively, discrete sealing means such as O-rings may be used.

The upper (40) and lowers threads (45) may have a different pitch so as to stagger the engagement of the two seals formed upon winding of the dispenser retainer. For example, the pitches may be adjusted such that the first seal made is that between the surfaces (70) and (75) given the importance of preventing leakage of movable substance. That seal will be very tightly formed, with less important seal formed between surfaces (80) and (85) being slightly less tightly formed.

Figure 6:
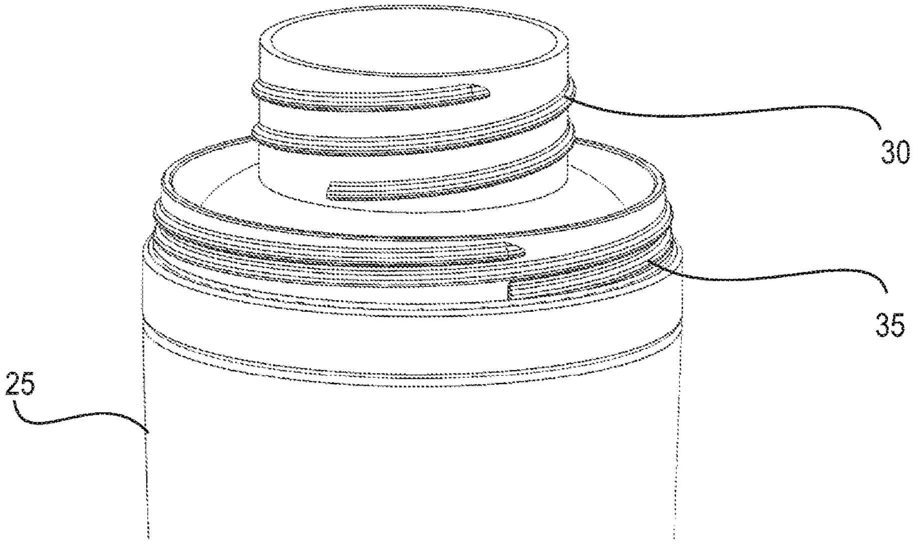
FIG. 6 illustrates in lateral view the neck of a vessel having a thread of relatively high pitch on the neck, the vessel seated in a vessel housing having a relatively low pitch about its upper edge.

The upper (40) and lowers threads (45) may have a different pitch so as cause the vessel (20) to move a larger distance as the dispenser retainer (15) is rotated by the user. The larger distance may be exploited to provide an automated closure disrupting function. Reference is made to FIG. 6 showing a relatively high pitch thread (30) on the vessel (20) and a relatively low pitch thread (35) on the dispenser housing (15), so as to ensure the vessel (20) is moved a relatively large distance.

Figure 7A:
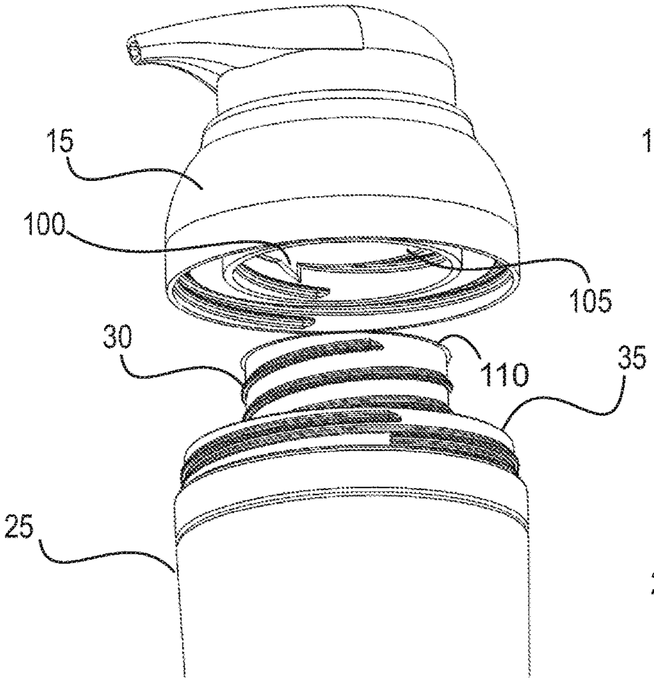
FIG. 7A illustrates in lateral view a system capable of automatic cutting of a vessel closure when the dispenser retainer is wound onto the vessel neck and vessel housing.
Figure 7B:
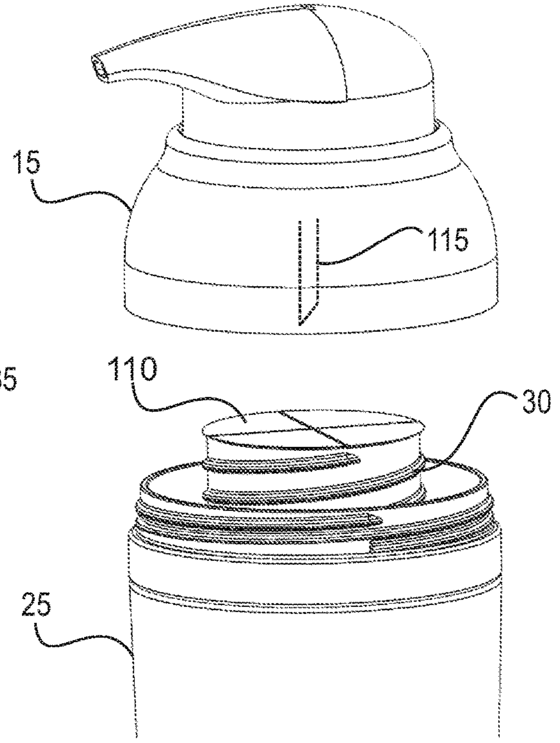
FIG. 7B illustrates in lateral view a system capable of automatically piercing a vessel closure when the dispenser retainer is wound onto the vessel neck and vessel housing.

Exemplary automatic disrupting arrangements are shown at FIG. 7A and FIG. 7B. Such arrangements may be useful where the dispenser does not have a dip tube, or any other feature capable of disrupting a closure (such as a foil seal) on a vessel. For example, the vessel may be inverted to allow gravity driven movement of the movable substance out of the dispenser.

The arrangement of FIG. 7A includes paired blades (100) and (105) which cut through the seal (110) as the dispenser retainer (15) is rotated so as to expose the vessel (20) interior. The arrangement of FIG. 7B comprises a hollow spike (115) which is forced through the seal (110) as the dispenser retainer (15) is rotated so as to communicate with the vessel (20) interior.

Figure 5:
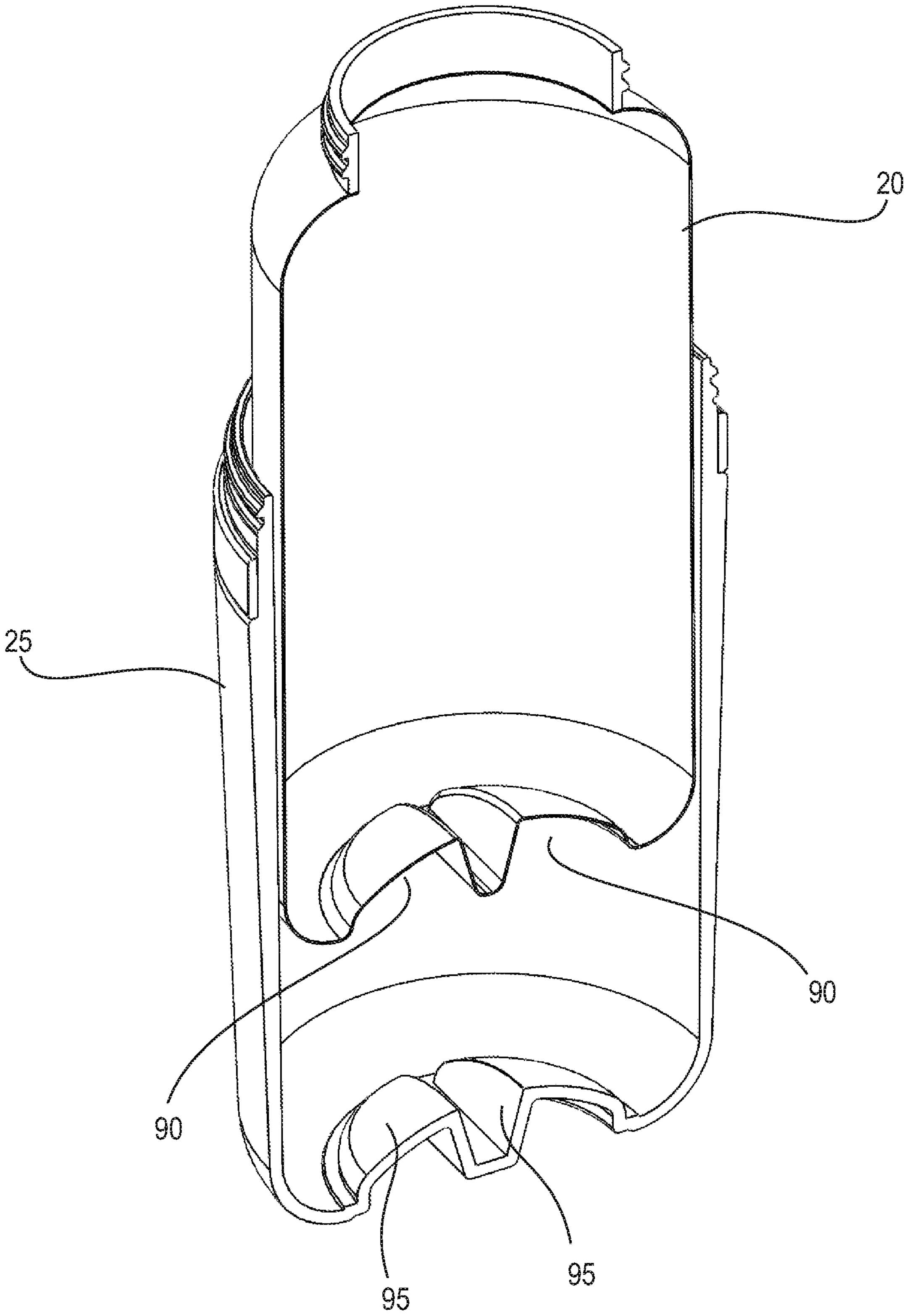
FIG. 5 illustrates in perspective cross-sectional view only the vessel and the vessel housing of the system drawn in FIG. 1. This illustration highlights the formation and recess which functions to prevent rotation of the vessel within the vessel housing.

The user will typically grasp the vessel housing (25) to prevent it from rotating when winding on the dispenser retainer (15). To prevent the vessel (20) from rotating, when winding on the dispenser retainer (15) engagement means are provided. In the embodiment shown in FIG. 5, the vessel (20) has a recess (90) formed in the base, and a complimentary formation (95) is provided in the base of the vessel housing (25). The recess (20) and formation (95) each has a pair (not drawn) on the opposing side of the vessel (20) and vessel housing (25).

Referring back to FIG. 3, advantageously the paired recesses (90) can form a bowl (100), with the dispenser (10) dip tube (55) extending into the lower region of the bowel (100). The bowl (100) circumference decreases toward its base so as to provide a pool of movable substance contactable by the dip tube (55) even when the volume of movable substance is very low. By this arrangement the last small volumes of movable substance may be drawn into the dip tube (55) thereby limiting wastage. Moreover, the sloped walls of the bowl (100) function to guide the dip tube (55) into the centre of the bowl (100) again maximising the ability to withdraw substantially all of the movable substance.

As will be appreciated, formations and recesses may be disposed longitudinally along the vessel (20) exterior and vessel housing (25) interior to achieve the same end of preventing rotation of the vessel (20).

When empty, the dispenser retainer (15) can be unwound by the user, and due to the anti-rotation features, all threads will unwind. This will allow the vessel (20) to disengage and release itself from its seal and threaded position. After the dispenser retainer (15) is removed, the vessel (20) sits in the vessel unsupported, and is free for removal by the user for placement into the recycling stream.

The embodiments described supra rely on rotational engagement between the vessel housing, the preferred forms of which are threaded engagement and lug-based engagement. Other forms of engagement are contemplated to be useful, including frictional engagement and snap engagement. Such forms are generally operable by the application of pushing force to engage and a pulling force to disengage the parts, and are useful not only with cylindrical components (i.e. vessel, vessel housing, and vessel retainer) which allow for rotational engagement, but also non-cylindrical components (such as ovoid, square or triangular components) which do not allow for rotational engagement.

It will be appreciated that the present system may utilise mixed forms of engagement for the engagement between the dispenser retainer and the vessel connecting portion, and the engagement between the dispenser retainer and the vessel housing. Just as an example, engagement between the dispenser retainer and the vessel connecting portion may be a friction engagement, with engagement between the dispenser retainer and the vessel housing being a threaded engagement. As another example engagement between the dispenser retainer and the vessel connecting portion may be a friction engagement, with engagement between the dispenser retainer and the vessel housing being a snap engagement. As another example engagement between the dispenser retainer and the vessel connecting portion may be a threaded engagement, with engagement between the dispenser retainer and the vessel housing being a snap engagement. As another example engagement between the dispenser retainer and the vessel connecting portion may be a snap engagement, with engagement between the dispenser retainer and the vessel housing being a snap engagement. For the sake of brevity, all possible workable combinations of engagement types will not be expressly recited, however all such combinations are included within the scope of the invention.

Figure 8A:
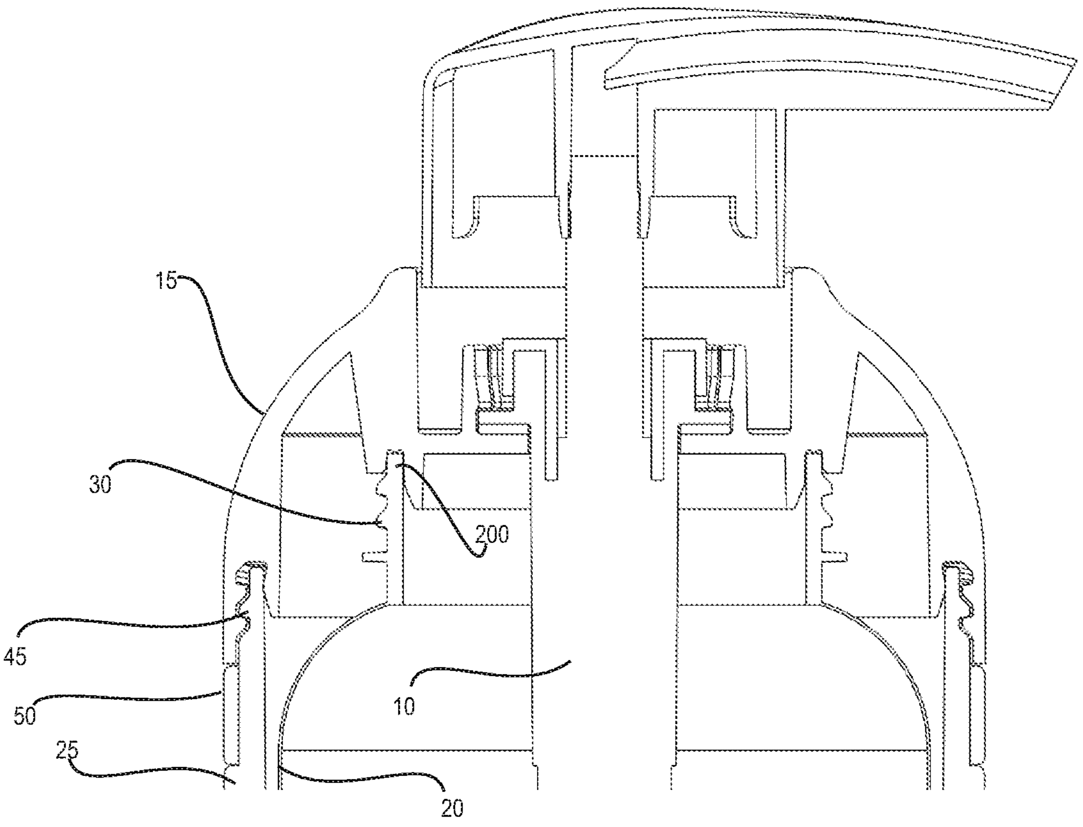
FIG. 8A illustrates in lateral cross-sectional view an embodiment that does not rely on a dual-thread engagement as shown in the earlier drawings, instead having only a single threaded engagement (between the vessel housing and the dispenser retainer) coupled with a friction engagement (between the vessel neck terminal region and the dispenser retainer).
Figure 8B:
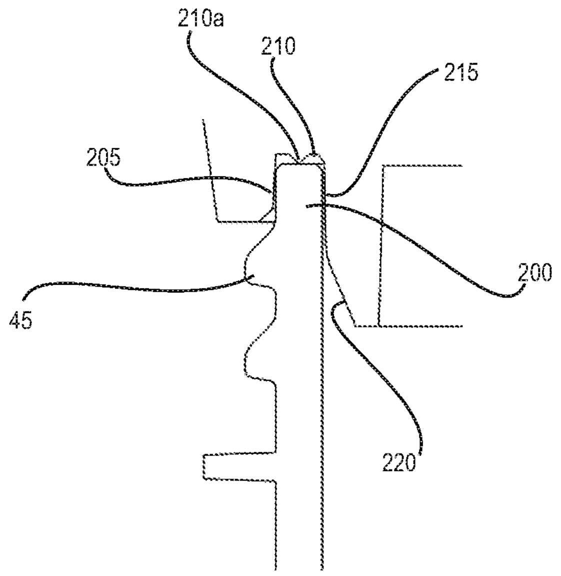
FIG. 8B is a magnification of a portion of FIG. 8A showing in greater detail the friction engagement between the vessel neck terminal region and the channel of the dispenser retainer

Reference is made to FIG. 8A and FIG. 8B showing an embodiment of the system whereby the dispenser retainer is engaged with the vessel housing by way of a threaded connection (as described for earlier embodiments), and the dispenser retainer is engaged with the vessel connecting portion by a scaling friction engagement. The friction engagement is provided by the terminal region (200) of the vessel neck portion inserting into a channel formed in the dispenser retainer. The channel provides three surfaces (205), (210), and (215), each of which makes contact with a respective face of the terminal region (200). The level of frictional engagement required is not necessarily high given that the terminal region (200) is unable to exit the channel once the dispenser retainer has been threaded securely onto the vessel housing.

In this embodiment, the three surfaces (205), (210), and (215) function together to provide a seal between the vessel inside and outside, thereby preventing leakage of any movable substance from the vessel. The surface (210) comprises a protrusion (210*a*) which bears against the upper surface of the terminal region (200). As the threads engaging the dispenser retainer and the vessel housing are wound together, the upper surface of the terminal region (200) and the protrusion (210*a*) are forced together thereby providing an increasingly tight seal.

Ramped surface (220) extending from the channel surface (215) functions to guide the terminal region (200) into the channel as the vessel housing and dispenser retainer are brought together during assembly.

In the embodiment of FIG. 8A and FIG. 8B the thread (45) of the vessel is redundant in so far that it does not contribute to an engagement. A thread may nevertheless be present to accept a screw cap to secure the movable product before the vessel is installed in the present system.

Figure 9A:
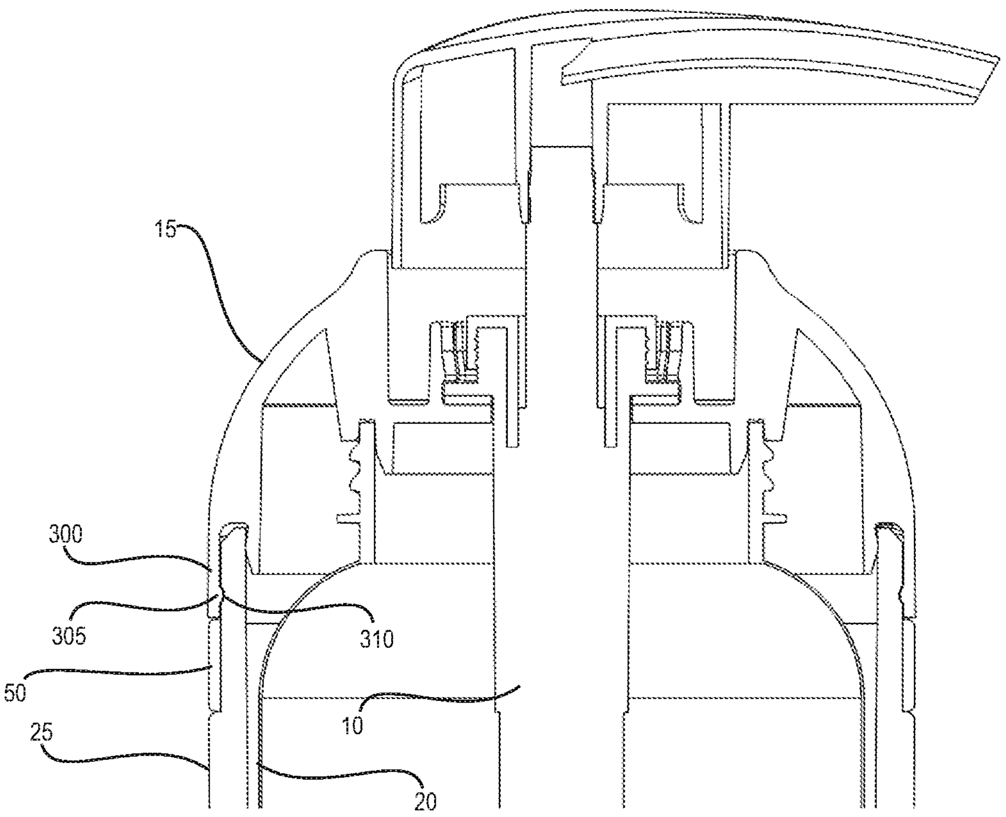
FIG. 9A illustrates in lateral cross-sectional view an embodiment having no threaded engagement whatsoever. This embodiment comprises the same friction engagement between the dispenser retainer and the vessel as for FIG. 8A and FIG. 8B, coupled with a snap engagement (an annular clip) between vessel housing and the dispenser retainer.
Figure 9B:
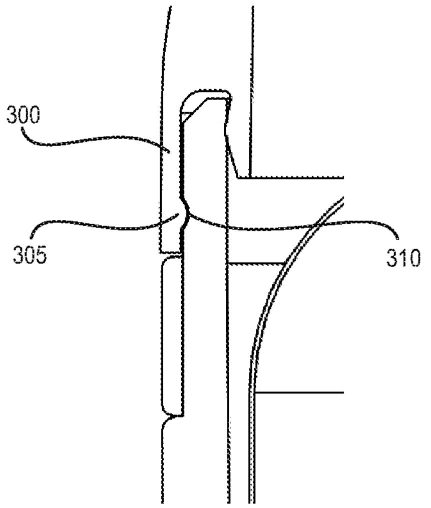
FIG. 9B is a magnification of a portion of FIG. 9A showing in greater detail the annular clip structures.

Considering the embodiment of FIGS. 9A and 9B, the vessel housing engages with the dispenser retainer by way of an annular clip (being a form of snap engagement). The clip is formed from an elastically deformable region (300) of the dispenser retainer having an annular inwardly disposed protrusion (305) disposed around the inner circumference of the deformable region (300). The outer circumference of the vessel housing comprises an annular depression (310) in register with the protrusion (305). As the dispenser retainer is moved downwardly onto the vessel housing, the protrusion (305) splays the deformable region (300) slightly outwardly until it seats into the depression (310). Pulling the dispenser retainer away from the vessel housing causes the protrusion (305) to exit the depression leading to the disengagement of the parts. Where the geometry of the component(s) is other than circular, the clip would not be described as annular, and may be described instead as peripheral.

A variation of the annular clip is a dimple clip, (being another form of snap engagement). In a dimple clip, a series of discrete protrusions are formed on the inner circumference of the deformable dispenser retainer. The outer circumference of the vessel housing comprises a series of depressions in register with the protrusions. As the dispenser retainer is moved downwardly onto the vessel housing, the protrusions splay the deformable region slightly outwardly until each seats into its respective depression.

Figure 10:
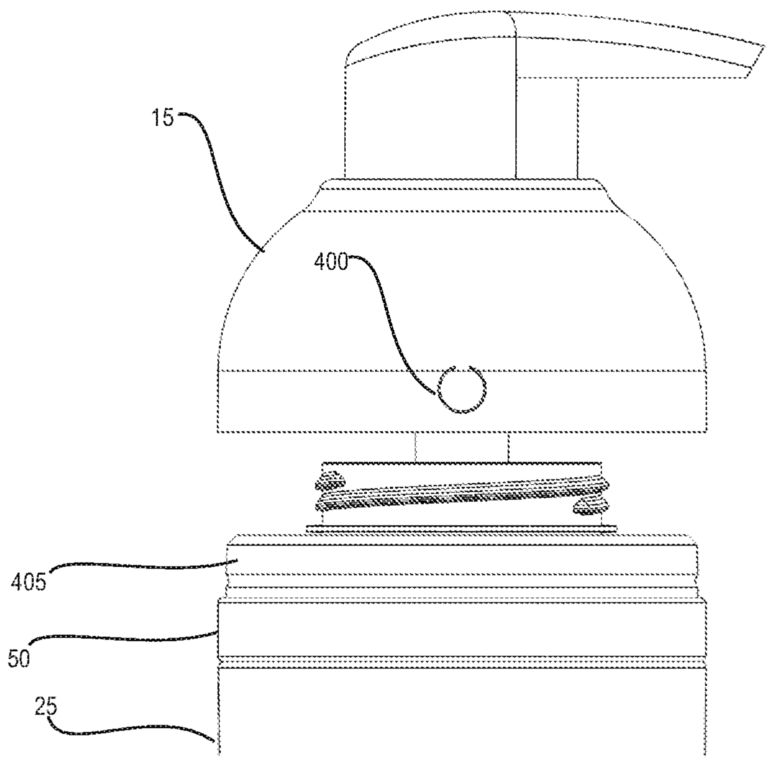
FIG. 10 illustrates in lateral view an embodiment having a hand operable actuator which actuates and engagement and disengagement mechanism to alternately bind and release the dispenser retainer and vessel housing.

The embodiment of FIG. 10 shows a further alternative manner of engaging the vessel housing with the dispenser retainer. In this embodiment a hand operable actuator (400) that may be depressed, pulled, twisted or moved laterally so as to operate an engagement and disengagement mechanism (not drawn) so as to alternately bind and release. The mechanism may interact with the formation (405) formed about the opening of the vessel housing, or function by any other means. Such mechanisms are known in unrelated arts such as luggage design (suitcase and brief case locks), and construction (door handles).

Turning now to further consideration of the vessel closure, the closure may be generally inseparable from the vessel and preferably be fabricated from the same material as the vessel. For example, a very thin plastic closure may be used that is disruptable so as to expose the contents. The vessel and closure remain associated and can be recycled essentially as a single item. Less preferred closures may comprise a different plastic or even a metal foil.

The refill vessel closure may be a screw cap made of a metal or a plastic, and may incorporate a disruptable panel or insert. Alternatively a plug-like closure may be inserted into a neck of the vessel. The plug may be disruptable (typically pierceable). Advantageously, a plug spares the thread on the vessel neck from wear or damage that may be occasioned by a screw cap.

The refill vessel closure may be a thin walled foil membrane which may be ultrasonically welded or heat pressed to refill vessel lip. The foil may have score lines to facilitate disruption by a hollow spike, for example.

A thin walled foil may be peelable, and therefore comprise an adhesive layer to fix to the refill vessel lip. The user peels the foil off and disposes of separately.

The dispenser of the present system may be any contrivance, arrangement of parts, device or apparatus that causes or allows a movable substance to exit the vessel to outside the system where it may be used by a user. The dispenser will typically be configured so as to prevent exit of a movable substance when not desired, for example when the system is tilted, knocked, dropped or tipped over. Such configuration may be achieved by a restriction in a flow channel, a valve, or a closure such as a removable plug, a removable cap, a lid, or the like.

In some cases, there is no requirement for a closure and the dispenser is simply an opening or a spout in communication with the interior of the vessel, and the movable substance is accessed by the user tipping the vessel to a desired angle until the substance moves.

In other embodiments, the dispenser is a pump, including a hand-operable pump, of the type often used to dispense liquid soap, shampoo, sunscreen, moisturiser and the like. The pump may be connected to a nozzle so as to output a spray.

In some embodiments the dispenser is a roll-on type dispenser of the type used on roll-on deodorants.

The dispenser may in some embodiments comprise a compressible portion configured to be manually squeezed by a user so as to cause a movable substance in the refill vessel to be urged from the system. In such embodiments, the dispenser may further comprise a less compressible portion (or a more rigid portion) configured to engage with the refill vessel.

The refill vessel may be fabricated from any material usable in the fabrication of a vessel that can hold a movable substance, including any man-made polymeric material. It will be generally desirable to utilise polymeric materials that are already in widespread use so as to facilitate production with existing machinery and protocols. In that regard, polyethylene-based materials are preferred including polyethylene terephthalate (also known as PET, PETE or polyester), high density polyethylene, low density polyethylene, and polystyrene.

Vacuum formed plastics are preferred given that the process involves stretching the plastic before setting into a desired shape. The stretching process acts to thin the lateral walls of the vessel thereby reducing the amount of plastic used. Vacuum forming will typically leave any neck unstretched, and therefore thicker than the lateral walls. A relatively thick neck is preferred given that it performs a mechanical support function within the system, and optionally as a sealing surface.

Blow moulding (regular or extrusion) is a further preferred means for fabricating the vessel. This method is able to produce vessels having an ultra-thin wall (for example, less than 0.25 mm) thereby saving significant amounts of plastic. Blow moulding may be used to produce a bottle-like vessel having a threaded neck (being thick and of necessarily rigid construction) and an ultra-thin lateral wall.

In some embodiments, the vessel is fabricated mainly from a flexible sheet-like plastic, optionally in the form of a bladder-like vessel. In such embodiments, a rigid support will be provided to confer the mechanical support function required in the context of the system. For example, a ring-like rigid plastic structure may be fixed to the upper end of the bladder. The sheet-like plastic may be held taught within the confines of the ring-like structure, so as to facilitate disruption of a closure.

In one embodiment of the vessel, a single polymeric material is used so as to facilitate recycling. In this regard, consideration is had not only to the vessel proper but also any associated structures such as closures, closure retaining rings, handles and the like which may otherwise contaminate the recycling stream for a particular polymer.

Irrespective of the material used to form the vessel, it is preferred that in the final vendible form presented to the consumer the vessel is substantially devoid of any label, adhesive, ink and the like which may contaminate the recycling stream. As will be appreciated, it may be desirable or necessary to include some type of identification on the vessel in the form of text and/or graphics. In such circumstances the label, adhesive, ink and the like may be easily removable with an aqueous solvent. Preferably, the label, adhesive, ink and the like is removable by a washing or an air blowing process that is included in the recycling process such that there is no onus on the consumer to wash the vessel before sending to the recycling stream.

Alternatively, text and/or graphics may be etched or embossed or otherwise formed into the vessel material.

The vessel housing may be a continuous shell substantially surrounding the vessel, or may be a cage-like contrivance which sufficiently protects the vessel from deformation and/or moisture ingress. While the housing may be reused many times it is preferably fabricated from a recyclable material (such as a recyclable plastic, a cellulosic material, a ceramic, or a vitreous material) such that at the end of its useful life it may also be placed into a recycling stream. Alternatively, the housing may be comprised of a degradable resource such as a sustainable wood material.

In general, the exterior of the housing is configured so as to be aesthetically pleasing. Thus, the housing may be shaped, coloured or otherwise arranged so as have a consumer-acceptable appearance. Brand indicium may be provided on an external face of the housing including company branding and logos. Text and/or graphics descriptive of the vessel contents may also be applied.

In a preferred embodiment of the invention, the vessel is a generally cylindrical vessel having generally circular upper and lower ends.

The dispenser of the present system may be any contrivance, arrangement of parts, device or apparatus that causes or allows a movable substance to exit the vessel to outside the system where it may be used by a user. The dispenser will typically be configured so as to prevent exit of a movable substance when not desired, for example when the system is tilted, knocked, dropped or tipped over. Such configuration may be achieved by a restriction in a flow channel, a valve, or a closure such as a removable plug, a removable cap, a lid, or the like.

In some cases, there is no requirement for a closure and the dispenser is simply an opening or a spout in communication with the interior of the vessel, and the movable substance is accessed by the user simply tipping the vessel to a desired angle until the substance moves.

In other embodiments, the dispenser is a pump, including a hand-operable pump, of the type often used to dispense liquid soap, shampoo, sunscreen, moisturiser and the like.

In some embodiments the dispenser is a roll-on type dispenser of the type used on roll-on deodorants.

The dispenser may in some embodiments comprise a compressible portion configured to be manually squeezed by a user so as to cause a movable substance in the thin-walled vessel to be urged from the system. In such embodiments, the dispenser may further comprise a less compressible portion (or a more rigid portion) configured to engage with the thin-walled vessel.

In some embodiments, the system has the outward appearance of a bottle (optionally being scalable or closable by a closure such as a lid or a screw cap). In fact, the bottle portion is comprised of three parts: a deformable vessel holding the movable substance, a housing about the vessel, and a dispenser retainer having a channel formed therein and opening into a bottle neck. A closure may comprise a fourth part. The dispenser retainer is screwed onto the housing such that the deformable vessel sealingly engages with the channel. The movable substance within the vessel can only exit via the channel and bottle neck (after any closure is removed, of course), the sealing engagement preventing any other route of exit thereby obviating any leakage.

The present system may be configured to form a water-tight seal between the dispenser and the thin-walled vessel so as to prevent inadvertent egress of a movable substance from the system. As will be appreciated, a water-tight seal may not be necessary where the movable substance is a dry material such as granular substance and in which some cases no seal at all may be necessary.

Where two sealing means are provided, the system may be configured such that the seals commence engagement at staggered times in the process of engaging the dispenser retainer with the vessel housing. For example, the seal preventing egress of movable substance may commence engagement firstly and the seal preventing ingress of moisture may commence engage shortly thereafter, and at a third time point the dispenser retainer and vessel housing are fully coupled. These three time points may arise, for example, during the time taken to fully screw the dispenser retainer onto the vessel housing. In this way, the seal preventing egress of movable substance is compressed to a greater extent than the seal preventing ingress of water. A lower level compression for the seal preventing egress of movable substance may be desired so as to prevent difficulty in unscrewing the dispenser retainer from the vessel housing. The lower level of compression (and therefore a less secure seal) may be acceptable for the less critical task of preventing moisture ingress into the system.

In some embodiments, the system has the outward appearance of a bottle (optionally being scalable or closable by a closure such as a lid or a screw cap). In fact, the bottle portion is comprised of three parts: a refill vessel holding the movable substance, a housing about the vessel, and a dispenser retainer having a channel formed therein and opening into a bottle neck. A closure may comprise a fourth part. The dispenser retainer is screwed onto the housing such that the refill vessel sealingly engages with the channel. The movable substance within the refill vessel can only exit via the channel and bottle neck (when any closure is removed, of course), the sealing engagement preventing any other route of exit thereby obviating any leakage.

Any embodiment of the present invention may be used for holding and/or dispensing for movable substances such as a flowable substance including a liquid composition, a liquid solution, a liquid emulsion, a liquid mixture, a slurry, a foam, a gel, a powdered substance or a granulated substance. Alternatively, the substance may be substantially non-flowable substances such as a face cream or a thick gel. The dispenser may be chosen according to the movable substance concerned.

The movable substance may have a level of toxicity to humans (as determined by ingestion), and is not safely edible or drinkable. The movable substance may be a personal care substance including but not limited to a liquid soap, a shampoo, a bath additive, a hair conditioner, a hair styling composition (such as a gel), a hair remover, skin conditioner, a skin moisturiser, an artificial tanning composition, a tanning accelerator, a topical medicament, a cosmetic, a sunscreen, a dentifrice, a mouthwash, a shaving lotion, a cologne, an after shave, a skin scrub, and a talcum powder.

The movable substance may be a household agent including but not limited to a cleaning composition, an air freshener, an ironing aid, an insecticide, a herbicide, a lubricant, and a dishwasher drying aid.

The movable substance may be a food, and particularly a non-beverage food, including a sauce, a salad dressing, a mayonnaise, a puree, a concentrate, a condensed milk, or a powdered milk for example.

The movable substance may be used in a heavy or a light industry, and may be an adhesive, a solvent, a diluent, an abrasive, a thermally conducting substance, an electrically conducting substance, a thermally insulating substance, an electrically insulating substance, a catalyst, a dye, a mordant, an etching substance, an acid, or a base.

The present invention has been described by reference to the aspects of a system, a vessel and a method. It will appreciated that any feature described in reference to one aspect is applicable to any other aspect. For example, where a feature of a vessel is described in relation to the system, that feature is also applicable to the vessel per se (and in the absence of other system components), or to a method that uses the vessel.

Those skilled in the art will appreciate that the invention described herein is susceptible to further variations and modifications other than those specifically described. It is understood that the invention comprises all such variations and modifications which fall within the spirit and scope of the present invention.

While the invention has been disclosed in connection with the preferred embodiments shown and described in detail, various modifications and improvements thereon will become readily apparent to those skilled in the art.

Accordingly, the spirit and scope of the present invention is not to be limited by the foregoing examples, but is to be understood in the broadest sense allowable by law.

The invention claimed is:

1. A system for holding and dispensing a movable substance, the system comprising:
- a deformable vessel configured to hold a movable substance and comprising a vessel connecting portion;
- a vessel housing configured to receive the vessel;
- a dispenser configured to cause or allow a movable substance to flow from the vessel via the vessel connecting portion to outside the system; and
- a dispenser retainer configured to maintain the dispenser in operable association with a movable substance held by the vessel,
- wherein the system is configured such that the dispenser retainer is alternately (i) engageable with the vessel connecting portion as the dispenser retainer is engaged with the vessel housing, and (ii) disengageable from the vessel connecting portion as the dispenser retainer is disengaged from the vessel housing, and the vessel housing is configured to support the dispenser retainer at a vertical level allowing for engagement between the dispenser retainer and the vessel connecting portion.

2. The system of claim 1, wherein the dispenser retainer is sealingly engageable with the vessel connecting portion.

3. The system of claim 1, configured such that in the engagement between the dispenser retainer and the vessel, at most only minor or insubstantial downward force is placed on the vessel connecting portion by the dispenser retainer.

4. The system of claim 3, wherein the minor or insubstantial downward force is insufficient to deform the vessel to the point that (i) a sealing engagement between the dispenser retainer and the vessel connecting portion is not possible and/or (ii) a movable substance within the vessel is caused to exit the vessel.

5. The system of claim 3, comprising complimentary structures on the dispenser retainer and the vessel connecting portion, and wherein the configuration is provided by the respective design, operation, structure, or material of the complimentary structures.

6. The system of claim 1, wherein the dispenser retainer is rotationally engageable with the vessel connecting portion, or engageable by pushing together the dispenser retainer and the vessel connecting portion.

7. The system of claim 5, wherein the complimentary structures provide for engagement between the dispenser retainer and the vessel connecting portion, the engagement being a threaded engagement, a friction engagement, snap engagement, or another type of engagement.

8. The system of claim 7, wherein the dispenser retainer has a thread, and the vessel connecting portion has a complimentary thread; or the dispenser retainer has a lug, and the vessel connecting portion has a complimentary lug guide; or the vessel connecting portion has a lug, and the dispenser retainer has a complimentary lug guide; or the vessel connecting portion has a friction engagement structure, and the dispenser retainer has a complimentary friction engagement structure; or the vessel connecting portion has a snap engagement structure, and the dispenser retainer has a complimentary snap engagement structure.

9. The system of claim 8 wherein the friction engagement structures are an opening region of the vessel connecting portion, and a channel of the dispenser retainer configured to accept the opening region.

10. The system of claim 1, wherein the dispenser retainer is configured to sealingly engage with the vessel housing.

11. The system of claim 10, wherein the dispenser retainer is rotationally sealingly engageable with the vessel housing or is sealingly engageable by pushing together the dispenser retainer and the vessel housing.

12. The system of claim 10 comprising complimentary structures on the dispenser retainer and the vessel housing, and wherein the configuration is provided by the respective design, operation, structure, or material of the complimentary structures.

13. The system of claim 12, wherein the complimentary structures provide for engagement between the dispenser retainer and the vessel housing, the engagement being a threaded engagement, a friction engagement, a snap engagement, or another type of engagement.

14. The system of claim 10, wherein the dispenser retainer has a thread, and the vessel housing has a complimentary thread; or the dispenser retainer has a lug, and the vessel housing has a complimentary lug guide; or the vessel housing has a lug, and the dispenser retainer has a complimentary lug guide; or the dispenser retainer has a friction engagement structure and the dispenser housing has a complimentary friction engagement structure; or the dispenser retainer has a snap engagement structure and the dispenser housing has a complimentary snap engagement structure.

15. The system of claim 12, wherein the complimentary structures of the dispenser retainer and the vessel connecting portion, are configured to initially mutually engage substantially concomitantly or at substantially different times when engaging the dispenser retainer with the vessel connecting portion, and wherein the complimentary structures are threads or a lug and a lug guide, the pitch of the threads, or a pitch of the lug and lug guide, are set such that upon rotation of the dispenser retainer, the vessel is moved toward the dispenser retainer at substantially the same rate or at a faster rate than the dispenser retainer is moved toward the vessel housing.

16. The system of claim 1, wherein the vessel comprises a closure that is partially or completely separable from the vessel and/or is disruptable so as to gain access to a movable substance contained therein.

17. The system of claim 1, wherein the dispenser or the dispenser retainer comprises a closure disrupting element, and the vessel comprises a disruptable closure, and wherein the system is configured such that the closure disrupting element disrupts the disruptable closure as the dispenser retainer is contacted to or engaged with the vessel housing.

18. The system of claim 1, wherein the vessel comprises a closure, and the closure is devoid of a thread for threaded engagement with the vessel.

19. The system of claim 4, wherein the vessel connecting portion is a neck having a wall thickness greater than that of a wall of the remainder of the vessel.

20. The system of claim 1, wherein the vessel is a blow moulded plastic vessel.

* * * * *